(12) United States Patent
Min et al.

(10) Patent No.: US 8,848,123 B2
(45) Date of Patent: Sep. 30, 2014

(54) LIQUID CRYSTAL DISPLAY DEVICE

(75) Inventors: Hyo-Jin Min, Paju-si (KR); Yong-Min Ha, Seoul (KR); Han-Wook Hwang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 39 days.

(21) Appl. No.: 13/338,812

(22) Filed: Dec. 28, 2011

(65) Prior Publication Data

US 2012/0218491 A1 Aug. 30, 2012

(30) Foreign Application Priority Data

Feb. 24, 2011 (KR) ........................ 10-2011-0016535

(51) Int. Cl.
*G02F 1/1333* (2006.01)
*G02F 1/1343* (2006.01)
*G02F 1/1345* (2006.01)

(52) U.S. Cl.
CPC ...... *G02F 1/133308* (2013.01); *G02F 2202/22* (2013.01); *G02F 2001/133331* (2013.01); *G02F 2202/28* (2013.01)
USPC .............. 349/40; 349/59; 349/122; 349/141; 349/150; 349/158

(58) Field of Classification Search
USPC ............... 349/40, 58, 141, 59, 122, 150, 158
See application file for complete search history.

(56) References Cited

U.S. PATENT DOCUMENTS

| 6,034,757 | A * | 3/2000 | Yanagawa et al. | 349/141 |
| 6,525,786 | B1 * | 2/2003 | Ono | 349/40 |
| 8,023,082 | B2 * | 9/2011 | Fukuda et al. | 349/122 |
| 2006/0001821 | A1 * | 1/2006 | Dewa et al. | 349/150 |
| 2006/0139501 | A1 * | 6/2006 | Lee et al. | 349/21 |
| 2008/0137020 | A1 * | 6/2008 | Takahashi et al. | 349/150 |
| 2010/0296027 | A1 * | 11/2010 | Matsuhira et al. | 349/96 |
| 2010/0309404 | A1 * | 12/2010 | Lim | 349/58 |

FOREIGN PATENT DOCUMENTS

| JP | 2004-355035 | 12/2004 |
| JP | 2008-209468 | 9/2008 |
| JP | 2008-233853 | 10/2008 |

OTHER PUBLICATIONS

Office Action issued in corresponding Japanese Patent Application No. 2011-287232, mailed Mar. 19, 2013.
Office Action issued in corresponding Japanese Patent Application No. 2011-287232, mailed Sep. 5, 2013, 5 pages.

* cited by examiner

*Primary Examiner* — Nathanael R Briggs
(74) *Attorney, Agent, or Firm* — Brinks Gilson & Lione

(57) ABSTRACT

A liquid crystal display device includes a liquid crystal display module including an in-plane switching mode liquid crystal panel; a first cover covering a rear side of the liquid crystal display module; a second cover covering a front side of the liquid crystal display module and including a transparent conductive layer; and a discharging path connecting the transparent conductive layer to the in-plane switching mode liquid crystal panel, wherein the transparent conductive layer is attached to the liquid crystal display module.

7 Claims, 4 Drawing Sheets backlight unit(130)

LIQUID CRYSTAL DISPLAY DEVICE

This application claims the priority and the benefit under 35 U.S.C. §119(a) on Korean Patent Application No. 10-2011-0016535 filed in Korea on Feb. 24, 2011, the entire contents of which are hereby incorporated by reference.

BACKGROUND

1. Field of the Invention

The present disclosure relates to a liquid crystal display (LCD) device, and more particularly, to an LCD device being capable of easily discharging a unnecessary charges, e.g., a static electricity.

2. Discussion of the Related Art

The liquid crystal display (LCD) device, which is adequate to display moving images and has an advantage in a contrast ratio, is widely used for a display device such as a television and a monitor. The LCD device uses optical anisotropy and polarization properties of liquid crystal molecules.

The LCD device includes a liquid crystal panel as an essential element. Two substrates with a liquid crystal layer therebetween are attached to form the liquid crystal panel. The alignment of the liquid crystal molecules is changed by an electric field generated in the liquid crystal panel such that images can be displayed by controlling light transmissivity.

Since an active matrix LCD device using a vertical electric field has excellent characteristics such as high resolution and display of moving images, the active matrix LCD device has been widely used. Unfortunately, the device using the vertical electric field has a disadvantage in a viewing angle.

To overcome the disadvantage in the viewing angle, various methods, e.g., an in-plane switching (IPS) mode LCD device, have been developed.

FIG. 1 is a schematic cross-sectional view of the related art liquid crystal panel for the IPS mode LCD device. As shown in FIG. 1, the liquid crystal panel for the IPS mode LCD device includes a first substrate 10 as an array substrate, a second substrate 20 as a color filter substrate, and a liquid crystal layer 30 therebetween.

On the first substrate 10, a common electrode 12 and a pixel electrode 14 are formed. A horizontal electric field L is generated between the common and pixel electrodes 12 and 14. The liquid crystal molecules 31 are driven by the horizontal electric field L. On the second substrate 20, a black matrix 21 shielding a non-display region and a color filter layer 23 including red, green and blue color filter patterns are formed.

In addition, first and second polarization plates 40 and 50 are formed on outer sides of the first and second substrates 10 and 20, respectively. An optical axis of the first polarization plate 40 is perpendicular to an optical axis of the second polarization plate 50.

Since the liquid crystal molecules 31 are driven by the horizontal electric field L between the common and pixel electrodes 12 and 14 on the first substrate 10, the viewing angle of the IPS mode LCD device is improved.

On the other hand, by unnecessary charges, e.g., a static electricity, the electrodes and the lines of the IPS mode LCD device are damaged and an alignment of the liquid crystal molecules 31 is misaligned.

Particularly, since there is no metal element on the second substrate 20, the static electricity on the second substrate 20 cannot be discharged. To prevent damages from the static electricity, a transparent conductive material layer 60 as an anti-static layer is formed on an outer surface of the second substrate 20. The transparent conductive material layer 60 is electrically connected to the first substrate 10 using a silver dot (not shown) or a conductive tape (not shown) such that the static electricity on the second substrate 20 is discharged through the first substrate 10.

However, when the silver dot or the conductive tape is formed, there may be damages on the second polarization plate 50. In addition, a process time is increased. Moreover, a viewing angle is violated by the silver dot or the conductive tape. Furthermore, since there is a step difference on a top surface of an element on the first substrate 10, a problem of crack is generated on the silver dot under a high temperature condition such that the static electricity cannot be discharged. As a result, there are damages on the LCD devices.

BRIEF SUMMARY

A liquid crystal display device includes a liquid crystal display module including an in-plane switching mode liquid crystal panel; a first cover covering a rear side of the liquid crystal display module; a second cover covering a front side of the liquid crystal display module and including a transparent conductive layer; and a discharging path connecting the transparent conductive layer to the in-plane switching mode liquid crystal panel, wherein the transparent conductive layer is attached to the liquid crystal display module.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Reference will now be made in detail to the preferred embodiments, examples of which are illustrated in the accompanying drawings.

Figure 1A:
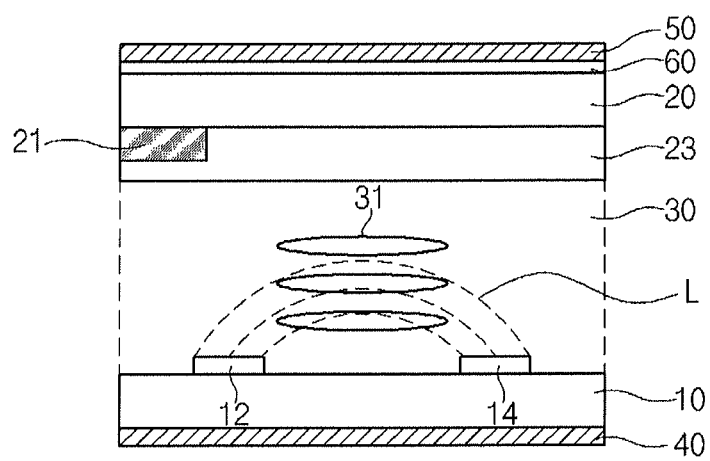
FIG. 1 is a schematic cross-sectional view of the related art liquid crystal panel for the IPS mode LCD device.
Figure 2:
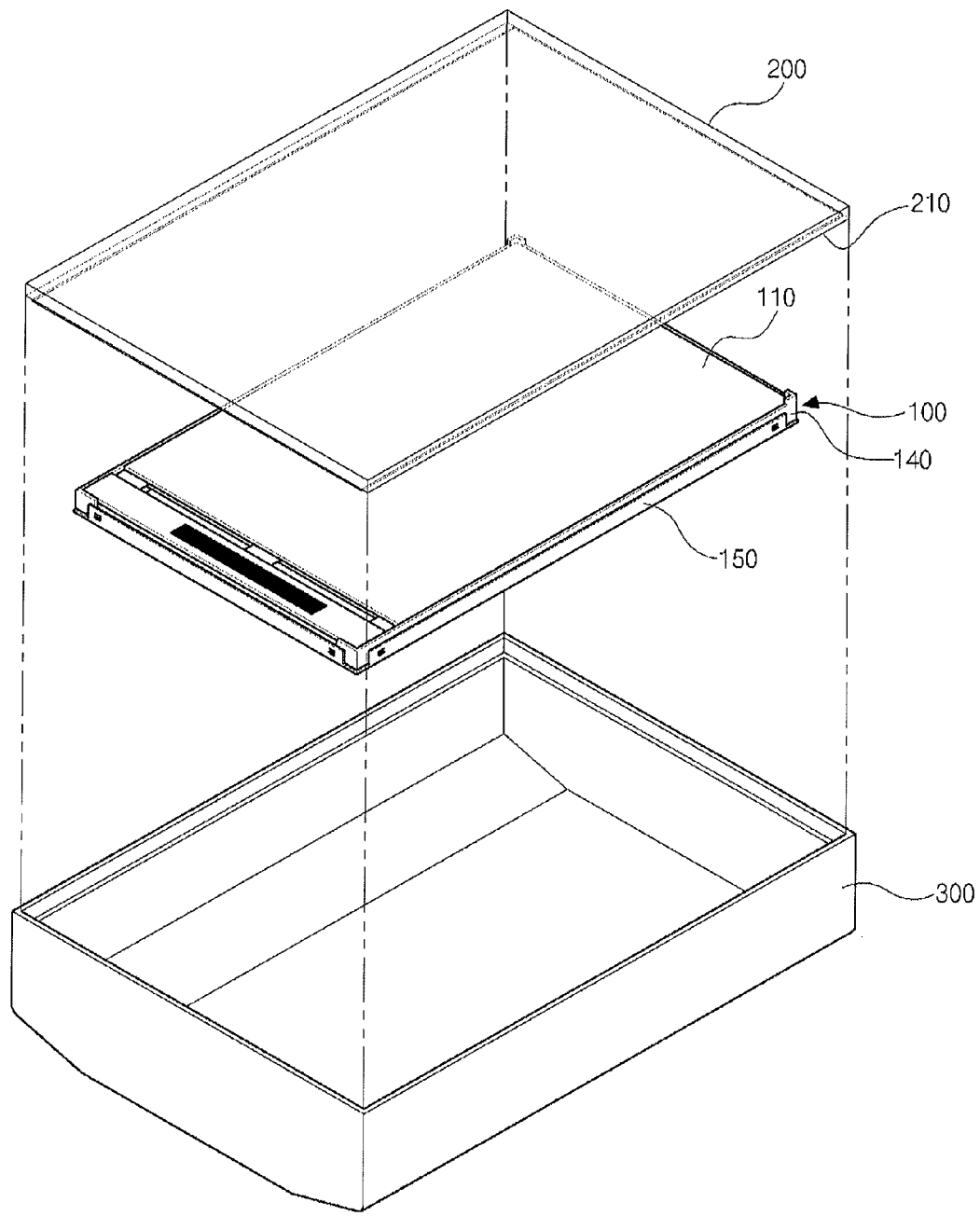
FIG. 2 is a schematic perspective view of an IPS mode LCD device according to an embodiment of the present invention.
Figure 3:
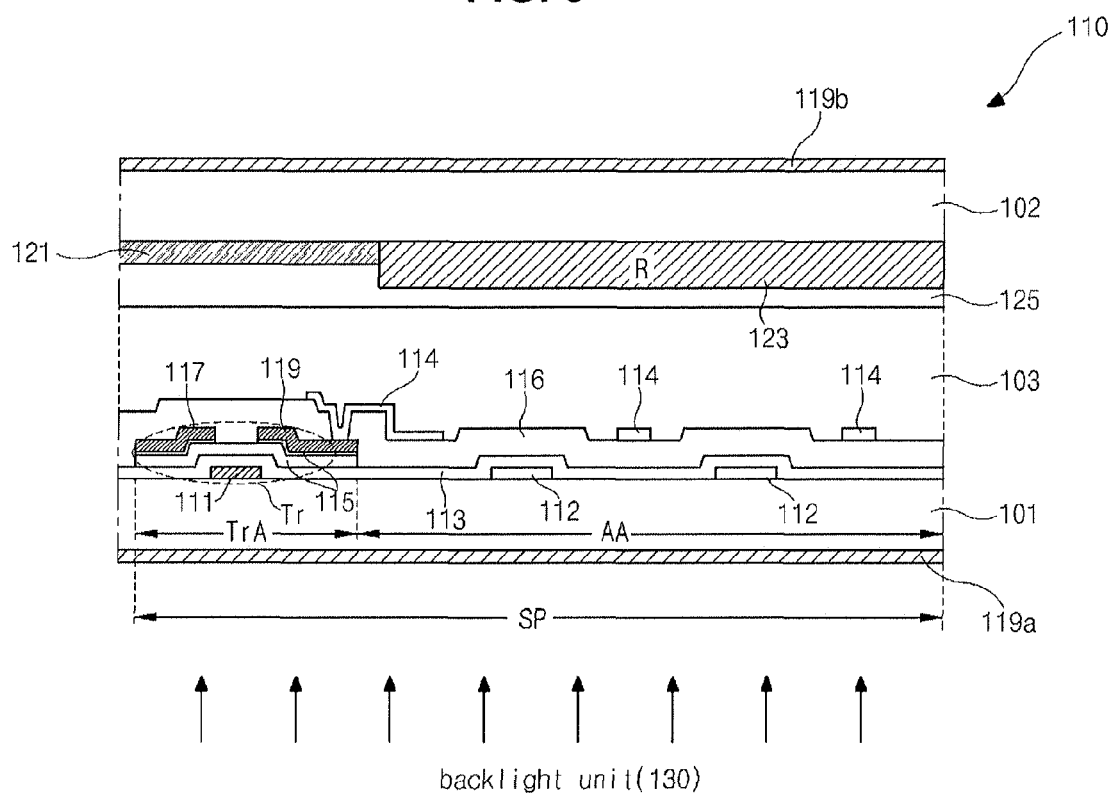
FIG. 3 is a schematic cross-sectional view a liquid crystal panel for an IPS mode LCD device according to an embodiment the present invention.

FIG. 2 is a schematic perspective view of an IPS mode LCD device according to the present invention, and FIG. 3 is a schematic cross-sectional view a liquid crystal panel for an IPS mode LCD device according to the present invention.

Referring to FIGS. 2 and 3, an IPS mode LCD device includes a liquid crystal display (LCD) module 100 for displaying images, a first cover 300 where the liquid crystal display module 100 is disposed, and a second cover 200.

The LCD module 100 includes an IPS mode liquid crystal panel 110, a backlight unit 130, a main frame 140 and a bottom frame 150.

As shown in FIG. 3, the IPS mode liquid crystal panel 110 includes an array substrate, a color filter substrate and a liquid crystal layer 103 therebetween. The array substrate includes a gate line (not shown), a data line (not shown), a common line (not shown), a thin film transistor (TFT) Tr, a common electrode 112 and a pixel electrode 114 on a first substrate 101. The gate and data lines cross each other to define a sub-pixel SP. The common line may be parallel to and spaced apart from the gate line. The TFT Tr is disposed in a switching region TrA at a crossing portion of the gate and data lines. The TFT Tr includes a gate electrode 111, a gate insulating layer 113, a semiconductor layer 115, a source electrode 117 and a drain electrode 119. The gate electrode 111 and the source electrode 117 are connected to the gate line and the data line, respectively, such that the TFT Tr is connected to the gate and data lines. The common and pixel electrodes 112 and 114 are disposed in a display region AA. The common electrode 112 is connected to the common line, and the pixel electrode 114 is connected to the drain electrode 119 of the TFT Tr. In FIG. 3, a passivation layer 116 including a drain contact hole, which exposes the drain electrode, is formed on the TFT Tr, and the pixel electrode 114 is disposed on the passivation layer. The pixel electrode 114 contacts the drain electrode 119 through the drain contact hole. The common electrode 112 and the pixel electrode 114 are alternately arranged with each other such that a horizontal electric field is generated therebetween.

The color filter substrate includes a black matrix 121, a color filter layer 123 and an overcoat layer 125 on a second substrate 102. The black matrix 121 has a lattice shape. The black matrix 121 shields a non-display region and has an opening corresponding to the sub-pixel SP. The color filter layer 123 includes red, green and blue color filter patterns and is disposed in the sub-pixel SP. Namely, the color filter layer 123 is disposed in the opening of the black matrix 121. The overcoat layer 125 covers the black matrix 121 and the color filter layer 123.

The above IPS mode liquid crystal panel 110 uses the horizontal electric field generated between the common and pixel electrodes 112 and 114 on the first substrate 101 such that a viewing angle is improved.

First and second polarizing plates 119a and 119b are formed on an outer side of the first and second substrates 101 and 102, respectively. In addition, a patterned spacer (not shown) for maintaining a cell gap of the first and second substrates 101 and 102 is formed. First and second alignment layers (not shown) for determining an initial arrangement of liquid crystal molecules of the liquid crystal layer 103 are formed on the first and second substrates 101 and 102, respectively. A seal pattern (not shown) for preventing a leakage of the liquid crystal layer 103 is formed along edges of the first and second substrates 101 and 102.

The backlight unit 130 providing light to the IPS mode liquid crystal panel 110 is disposed under the IPS mode liquid crystal panel 110. The IPS mode liquid crystal panel 110 and the backlight unit 130 are modulated by the main frame 140 and the bottom frame 150 such that the LCD module 100 is provided. The main frame 140 covers edges of the IPS mode liquid crystal panel 110 and the backlight unit 130 and is combined with the bottom frame 150. The bottom frame 150 includes a bottom surface and side surfaces and covers a rear side of the IPS mode liquid crystal panel 110.

The LCD module 100 is disposed in the first cover 300. Namely, the first cover 300 covers a front edge, a side surface and a rear surface of the LCD module 110. Namely, the first cover 300 includes a bottom surface and side surfaces and has an opening for displaying images.

The second cover 200 is modulated with the cover 300 such that the LCD device is provided. The second cover 200 covers the opening of the first cover 300. Namely, the second cover 200 protects a front surface of the LCD module 100. For example, the second cover 200 may be attached to the LCD module 100 using a double-sided adhesive tape (not shown). Since the second cover 200 is formed of a transparent material, e.g., glass, images from the LCD module 100 can be displayed through the second cover 200.

The LCD device does not include a top case covering a front edge of the IPS mode liquid crystal panel 110. Alternatively, the LCD device may include the top case.

The second cover 200 is formed of tempered glass having high thermal durability. With the second cover 200 of low thermal durability, there is damage on the cover glass by a heat from the backlight unit 130. For example, wrinkles may be generated on the cover glass. However, since the second cover 200 is formed of temperate glass, there is no damage.

On a lower surface of the second cover 200, a transparent conductive layer 210 as an anti-static layer is formed. Namely, the transparent conductive layer 210 faces and is closely attached the IPS mode liquid crystal panel 110. The transparent conductive layer 210 is formed of a transparent conductive material. For example, the transparent conductive layer may be formed of one of indium-tin-oxide (ITO) and indium-zinc-oxide (IZO). Since there is no conductive element on the color filter substrate for the IPS mode liquid crystal panel 110, the IPS mode liquid crystal panel 110 requires the transparent conductive layer 210 for preventing damages from a static electricity.

Figure 4:
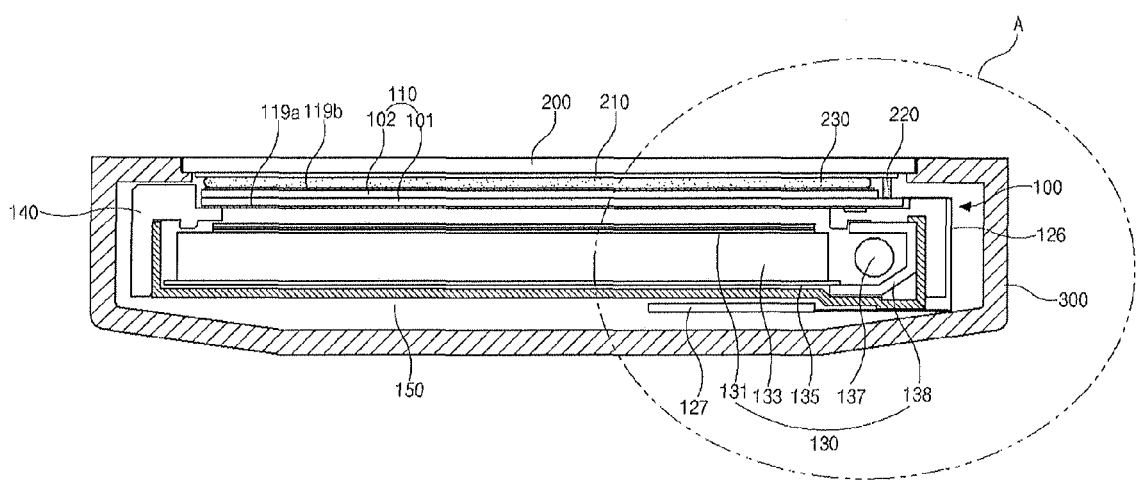
FIG. 4 is a schematic cross-sectional view of an IPS mode LCD device according to an embodiment the present invention.
Figure 5:
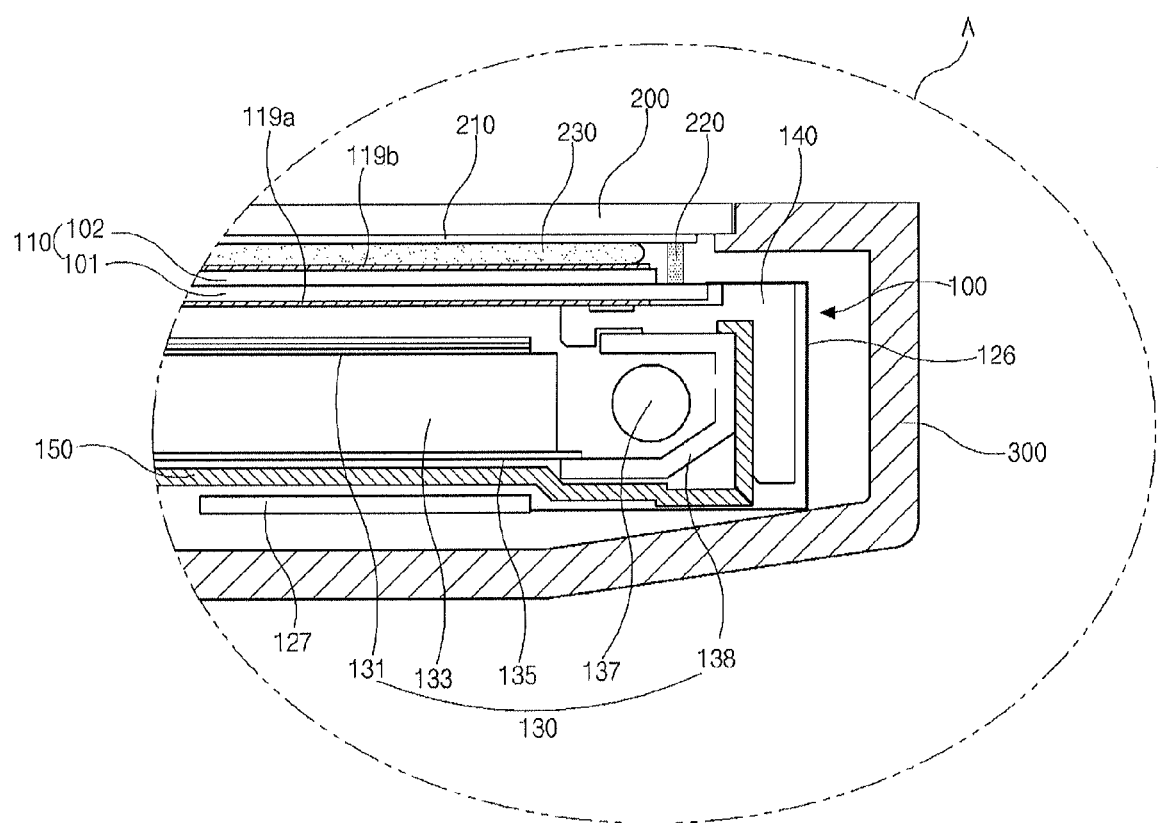
FIG. 5 is an enlarged view of "A" portion of FIG. 4.

FIG. 4 is a schematic cross-sectional view of an IPS mode LCD device according to the present invention, and FIG. 5 is an enlarged view of "A" portion of FIG. 4.

Referring to FIGS. 4 and 5, the LCD module 100 is modulated with the first and second covers 300 and 200. Namely, the first cover 300 covers a front edge, a side surface and a rear surface of the LCD module 100, and the second cover 200 covers a front center of the LCD module 100. The second cover 200 corresponds to the opening of the first cover 300.

The LCD module 100 includes the IPS mode liquid crystal panel 110, the backlight unit 130, the main frame 140 and the bottom frame 150.

In the IPS mode liquid crystal panel 110, the common electrode 112 (of FIG. 3) and the pixel electrode 114 (of FIG. 3) are formed on the first substrate 101 such that the liquid crystal molecules in the liquid crystal layer 103 (of FIG. 3) are driven by the horizontal electric field between the common and pixel electrodes 112 and 114. The backlight unit 130 is disposed under and provides light toward the IPS mode liquid crystal panel 110. The backlight unit 130 includes a reflective plate 135, a light guide plate 133 on the reflective plate 135, a lamp 137 and a lamp guide 138 at a side of the light guide plate 133, and an optical sheet 131 over the light guide plate 133. For example, a cold cathode fluorescent lamp, an external electrode fluorescent lamp, or a light emitting diode may be used for the lamp 137. The first and second polarization plates 119a and 119b for selectively transmitting light are disposed at an outer side of the first and second substrates 101 and 102, respectively.

In the above backlight unit 130, another lamp may be disposed at opposite side of the lamp 137. The above backlight unit 130 may be referred to as a side light type. Alternatively, a direct type backlight unit, where the lamp is directly on the reflective plate 125 without the light guide plate 133, may be used.

Side surfaces of the backlight unit 130 and the IPS mode liquid crystal panel 110 are covered with the main frame 140, and the bottom surface of the backlight unit 130 is covered with the bottom frame 150. As a result, the IPS mode liquid crystal panel 110 and the backlight unit 130 are modulated to by the main frame 140 and the bottom frame 150.

A printed circuit board 127 is connected to one side of the IPS mode liquid crystal panel 110 via a connection means 126. A unit for generating various control signals and a data single is positioned on the printed circuit board 127. Since the printed circuit board 127 is connected to a circuit or a pad on one side of the first substrate 101, the first substrate 101 has a larger size than the second substrate 102. Namely, when the first and second substrates 101 and 102 are attached, the one side of the first substrate 101 is exposed by the second substrate 102.

The LCD module 100 is disposed in the first cover 300. The front side of the LCD module 100 is exposed through the opening of the first cover 300. To protect the front side of the LCD module 100, the second cover 200 corresponding to the opening to the first cover 300 is attached to the front side of the LCD module 100. For example, the second cover 200 may be attached to the LCD module 100 using an adhesive means, e.g., a double-sided tape 230. In addition, the transparent conductive layer 210 is formed on the second cover 200. When the second cover 200 is attached to the LCD module 100, the transparent conductive layer 210 faces the LCD module 100. Namely, the second cover 200 with the transparent conductive layer 210 between the second cover 200 and the double-sided tape 230 is attached to the LCD module 100. Accordingly, the transparent conductive layer 210 is closely attached to the LCD module 100 with the double-sided tape 230 therebetween.

At one side of the transparent conductive layer 210, a discharging path 220 for electrically connecting the transparent conductive layer 210 and the first substrate 101 is disposed. The discharging path 220 has a column shape. Due to the transparent conductive layer 210 and the discharging path 220, a unnecessary charge, e.g., a static electricity, on the second substrate 102 is discharged through the transparent conductive layer 210, the discharging path 220 and the first substrate 101.

The discharging path 220 is formed of various conductive materials. For example, the discharging path 220 may be formed of a silver (Ag) dot or a conductive tape. At least one discharging path 220 is formed.

The transparent conductive layer 210 has a size being larger than the second substrate 102 and being substantially equal to the first substrate 101. Namely, the second cover 200, where the transparent conductive layer 210 is formed, has a size being equal to or being larger than the first substrate 101, and the transparent conductive layer 210 has a size being substantially equal to the first substrate 101. As a result, the discharging path 220 is positioned at an outside of the second substrate 102. Accordingly, the transparent conductive layer 210 and the first substrate 101 are easily connected to each other via the discharging path 220, and the discharging path 220 does not occupy a display region.

The transparent conductive layer 210 has a column shape. One end of the discharging path 220 contacts one side of the transparent conductive layer 210, and the other end of the discharging path 220 contacts the one side edge of the first substrate 101 where the circuit or pad are formed. Since the discharging path 220 is positioned not to overlap the second substrate 102, the display region of the LCD module 100 is not shaded by the discharging path 220. In addition, a side viewing angle is not violated by the discharging path 220.

In the present invention, the transparent conductive layer 210 is formed on a rear side of the second cover 200 to be closely attached to the second substrate 102 of the IPS mode liquid crystal panel 110, and the transparent conductive layer 210 is electrically connected to the first substrate 101 via the discharging path 220. As a result, damages from the static electricity are prevented.

Namely, since there is no metallic element, e.g., a common electrode on the second substrate 102, a unnecessary charge, e.g., the static electricity, on the second substrate 102 of the IPS mode liquid crystal panel 110 is not discharged. Accordingly, there are damages on the IPS mode liquid crystal panel 110 from the static electricity.

To prevent the above damages, the second cover 200, which includes a transparent conductive layer 210, is attached to the IPS mode liquid crystal panel 110 such that a static electricity on the second substrate 102 is discharged through the transparent conductive layer 210, the discharging path 220 and the first substrate 101. The static electricity is easily and quickly discharged such that a noise problem resulting from an interference between the static electricity and a signal in the IPS mode liquid crystal panel 110 and a wavy problem on a displaying image resulting from an effect of the static electricity on a potential of the pixel electrode 114 (of FIG. 3) or the common electrode 112 (of FIG. 3) are prevented.

In addition, since the transparent layer 210 is formed on the second cover 200 not the second substrate 102, a damage on the transparent conductive layer 210 or the second polarizing plate 119b is prevented. In more detail, when the transparent conductive layer 210 is formed on the second substrate 102, damages can be generated on the transparent conductive layer 210 during successive processes such that the transparent conductive layer 210 is not enough to discharge the static electricity on the second substrate 102. In addition, when a silver dot is formed with the transparent conductive layer 210, which is formed on the second substrate 102, damages can be generated on the second polarizing plate 119b. However, since the transparent conductive layer 210 is formed on the second cover 200 in the present invention, the above problems are prevented.

As mentioned above, in the IPS mode LCD device, the transparent conductive layer 210 as an anti-static layer is formed on the second cover 200 covering a front side of the LCD module 100 such that the static electricity on the second substrate 102 of the IPS mode liquid crystal panel 110 is discharged. In addition, since the transparent conductive layer 210 is formed on the second cover 200, damages on the transparent conductive layer or the second polarizing plate are prevented. Moreover, the transparent conductive layer 210 has a size larger than the second substrate 102 and substantially equal to the first substrate 101, the discharging path 220, which connects the transparent conductive layer 210 to the first substrate 101, is positioned at an outside of the second substrate 102. Accordingly, decrease of the display region by the discharging path 220 is prevented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:
1. A liquid crystal display device, comprising:
a liquid crystal display module including an in-plane switching mode liquid crystal panel;
a first cover covering a rear side of the liquid crystal display module;

a second cover covering a front side of the liquid crystal display module;

a transparent conductive layer on the second cover and disposed between the second cover and the liquid crystal display module; and a discharging path connecting the transparent conductive layer to the in-plane switching mode liquid crystal panel, wherein the transparent conductive layer is attached to the liquid crystal display module, and the in-plane switching mode liquid crystal panel includes first and second substrates facing each other, a common electrode and a pixel electrode on the first substrate and alternately arranged with each other, a polarization plate, and a liquid crystal layer between the first and second substrate, and wherein the polarization plate is disposed at the front side of the liquid crystal display module to be positioned between the second substrate and the transparent conductive layer, wherein the first substrate is larger than the second substrate such that one side of the first substrate is exposed, and wherein the transparent conductive layer has a size substantially equal to the first substrate.

2. The liquid crystal display device according to claim 1, wherein one end of the discharging path contacts the transparent conductive layer, and the other end of the discharging path contacts the one side of the first substrate.

3. The liquid crystal display device according to claim 2, wherein the discharging path has a column shape.

4. The liquid crystal display device according to claim 1, wherein the discharging path includes one of a silver dot or a conductive tape.

5. The liquid crystal display device according to claim 1, wherein the transparent conductive layer includes one of indium-tin-oxide or indium-zinc-oxide.

6. The liquid crystal display device according to claim 1, wherein the second cover is attached to the liquid crystal display module using a double-sided tape.

7. The liquid crystal display device according to claim 1, the liquid crystal display module further includes:
- a backlight unit disposed under and providing light toward the in-plane switching mode liquid crystal panel;
- a bottom frame covering the backlight unit; and
- a main frame covering a side of the in-plane switching mode liquid crystal panel.

* * * * *